United States Patent [19]
Kendall

[11] Patent Number: 5,653,179
[45] Date of Patent: *Aug. 5, 1997

[54] PORTABLE TRIPOD RISER

[76] Inventor: Charles S. Kendall, 6553 Kelsey Point Cir., Alexandria, Va. 22315

[ * ] Notice: The term of this patent shall not extend beyond the expiration date of Pat. No. 5,473,992.

[21] Appl. No.: 568,240

[22] Filed: Dec. 6, 1995

Related U.S. Application Data

[63] Continuation-in-part of Ser. No. 262,014, Jun. 17, 1994, Pat. No. 5,473,996.

[51] Int. Cl.⁶ .................................................. A47B 57/00
[52] U.S. Cl. ................................. 108/59; 108/128
[58] Field of Search .................. 108/59, 128, 115, 108/38, 150, 157; 297/17, 16.2; 248/165, 166, 160, 435, 170, 108.6, 108.7

[56] References Cited

U.S. PATENT DOCUMENTS

| | | | |
|---|---|---|---|
| 1,211,355 | 1/1917 | Rizzo | 248/435 |
| 1,226,554 | 5/1917 | Mante | 108/128 X |
| 1,277,988 | 9/1918 | Miller | 108/128 X |
| 1,865,323 | 6/1932 | Liberman | 108/128 X |
| 1,921,026 | 8/1933 | Garman | 108/128 X |
| 2,299,910 | 10/1942 | Linderne | 108/115 X |
| 2,742,955 | 4/1956 | Dominguez | 108/128 X |
| 3,960,092 | 6/1976 | Levkovski | 108/128 X |
| 5,473,996 | 12/1995 | Kendall | 108/128 X |

*Primary Examiner*—Jose V. Chen
*Attorney, Agent, or Firm*—Randy W. Lacasse

[57] ABSTRACT

A tripod is elevated off the ground and supported by a three legged unit so that when opened it cradles the legs and/or the spreader of a tripod. The unit has a base which restricts movement of each of the support legs and an accompanying platform leaf for the purpose of supporting a tripod operator. The unit's legs collapse together and are secured allowing the entire unit to be easily transported. A rotatable center support provides both support and ease-of-use functions.

20 Claims, 3 Drawing Sheets

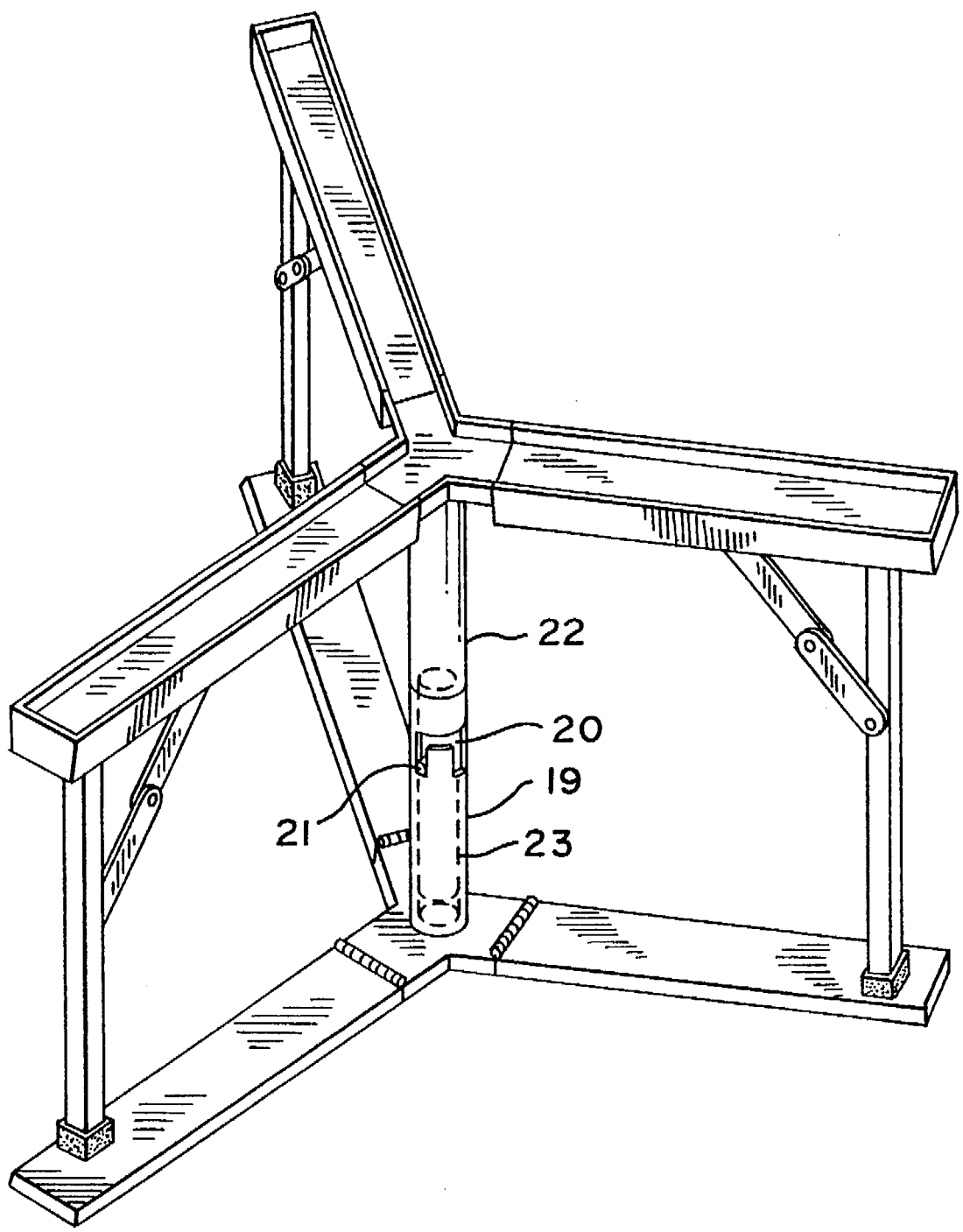
FIG_4

PORTABLE TRIPOD RISER

This application is continuation-in-part of application Ser. No. 08/262,014, filed Jun. 17, 1994, now U.S. Pat. No. 5,473,996.

BACKGROUND OF THE INVENTION

1. Field of Invention

This invention generally relates to instrument supporting platforms and more specifically is directed a portable riser to support and raise the elevation of tripods.

2. Discussion of Prior Art

When using a tripod to support an instrument, such as a camera, it is often desirable to raise the elevation of the tripod, and thus the camera, to achieve a more aesthetically pleasing picture. While most tripods have adjustable legs for the purpose of adjusting the instrument height, their maximum elevation is often limited to around five feet. Additionally, most individuals using the instrument mounted to the tripod cannot comfortably operate the instrument at elevations above five feet.

Conventional hotel type platforms, usually 8'×4', can sometimes be used to raise the tripod and operator to a higher elevation, however, these platforms are not very portable, extremely heavy, and consume a large amount of space in work environments where space is at a premium.

OBJECTS OF THE INVENTION

It is an object of this invention to provide for a portable tripod riser that, once set-up, supports and raises the elevation of an instrument supporting and/or an operator. Another object of the invention is to provide a riser that is portable and easily set-up by the operator. A further objective of the invention is to provide a tripod riser that consumes less space than traditional platform risers.

SUMMARY OF THE INVENTION

A portable tripod riser includes three elevated horizontal support legs to receive the three legs of an extended tripod. When opened, the three legs form a three pointed star. When closed, the legs are folded together for storage and transporting. An additional pair of folding legs opens downward underneath each of the three elevated horizontal support legs to support the tripod in a stable position. In addition, a separate lightweight platform accompanies the portable riser for the user to stand on to operate an electronic device (i.e. camera) which is usually attached to the top of the tripod.

Other objects and advantages of the invention will become apparent upon reading the following detailed description and upon reference to the drawings.

BRIEF DESCRIPTION OF THE DRAWINGS

FIG. 4 is a perspective view of an alternative embodiment showing a center support.

DESCRIPTION OF THE PREFERRED EMBODIMENTS

While the invention will be described in connection with preferred embodiments, it will be understood that I do not intend to limit the invention to these specific embodiments. On the contrary, I intend to cover all alternatives, modifications and equivalents as may be included within the spirit and scope of the invention as defined by the appended claims.

Figure 1:
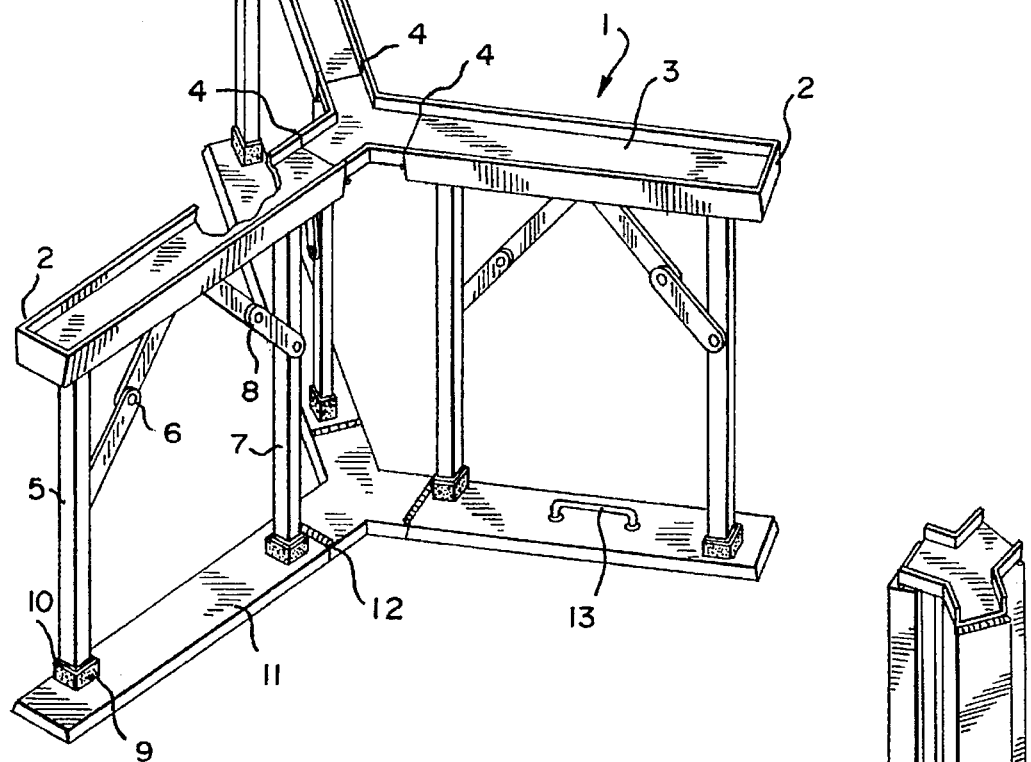
FIG. 1 is a perspective view of the tripod riser of the present invention opened to the operating position.

Turning to the drawings, there is shown in FIG. 1 an instrument support device 1 having three identical upper horizontal support legs 2 centrally connected with each leg having a trough-like interior section 3 which receives and supports a respective leg and spreader of a tripod (not shown). The well is approximately 1" deep and is intended to hold any tripod and/or tripod spreader in place when set-up. Each support leg 2 is hinged 4 near the central connection point. This hinge 4 allows each support leg to fold downwardly to assist in compaction for carrying or storage.

Each leg 2 is supported by a pair of legs, outer 5 and inner 7, each with hinged support brackets 6 and 8 respectively. The legs 5 and 7 are offset with respect to each other such that they may fold into the upper support leg 2 remaining in parallel throughout the folding process. The legs 5 and 7 lie side-by-side in a resting position against leg 2 when completely folded. When unfolded, an end-cap 10 fits into a receiving section 9 located on a lower three legged support 11, to secure the leg for side-to-side stability and assurance of a proper full extension. The receiving section 9 may be either a raised or recessed section.

Figure 2A:
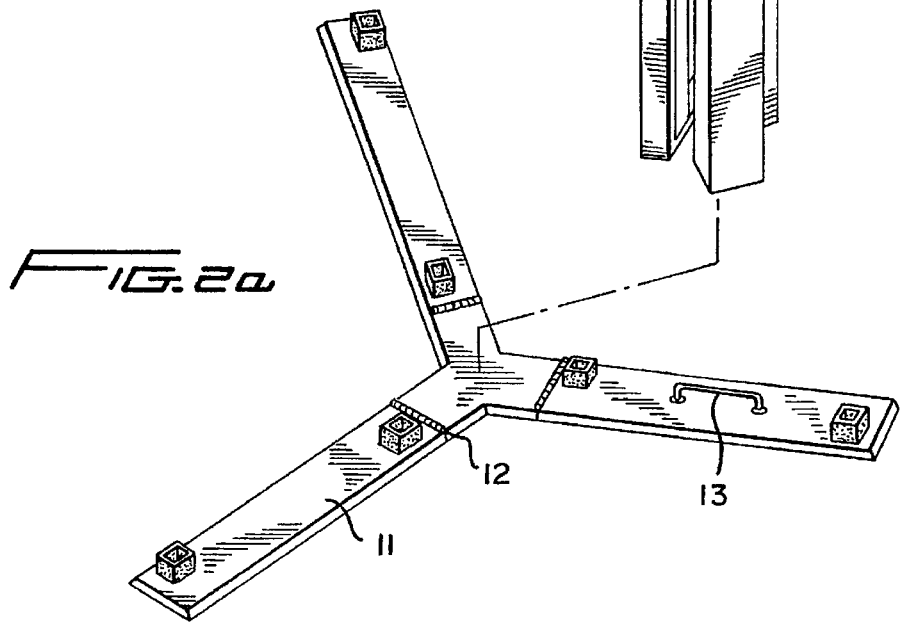
FIG. 2a is a perspective view of the tripod riser with the vertical and horizontal support legs closed.
Figure 2B:
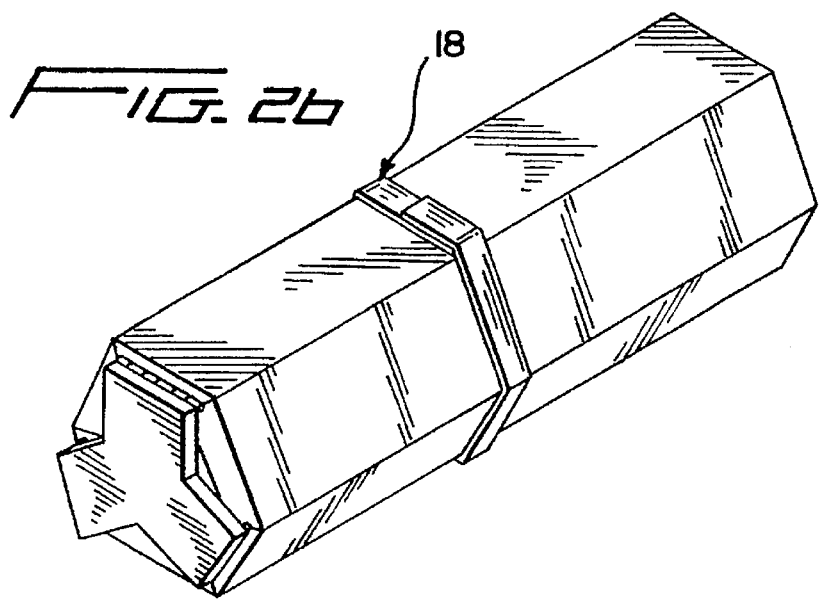
FIG. 2b is a perspective view of the tripod riser fully closed with a carrying handle.

FIG. 2a illustrates a perspective view of partially a folded implementation of the present invention. Legs 5 and 7 are folded upwardly to a fully closed position and then legs 2 are folded downwardly from hinges 4. Lower support base 11 is turned approximately sixty degrees and each leg folded upwardly from hinges 12 thereby fitting into the space between legs 2. FIG. 2b illustrates the final closed position. As shown, each leg of lower base 11 is bevelled to allow for a close fit into the space between legs 2.

A VELCRO™ 18, or other suitable fastener, is used to secure the final closed device. The VELCRO™ strap 18 is wrapped around the periphery of the folded legs. A second VELCRO™ strap (not shown) may be included and spaced equally along the length of the device. A third strap, not shown, may be secured between the two VELCRO™ straps to serve as a handle. In an alternative embodiment, a spring biased recessed handle 13, may be included in one of the legs of lower base 11. When the base 11 is laid flat onto the floor the handle pushes upward into the base. When the base is elevated (i.e. in the process of being folded-up) the handle pops out to assist in carrying. The handle should be centrally located along the length of one leg of base 11 to provide for proper balance.

Figure 3:
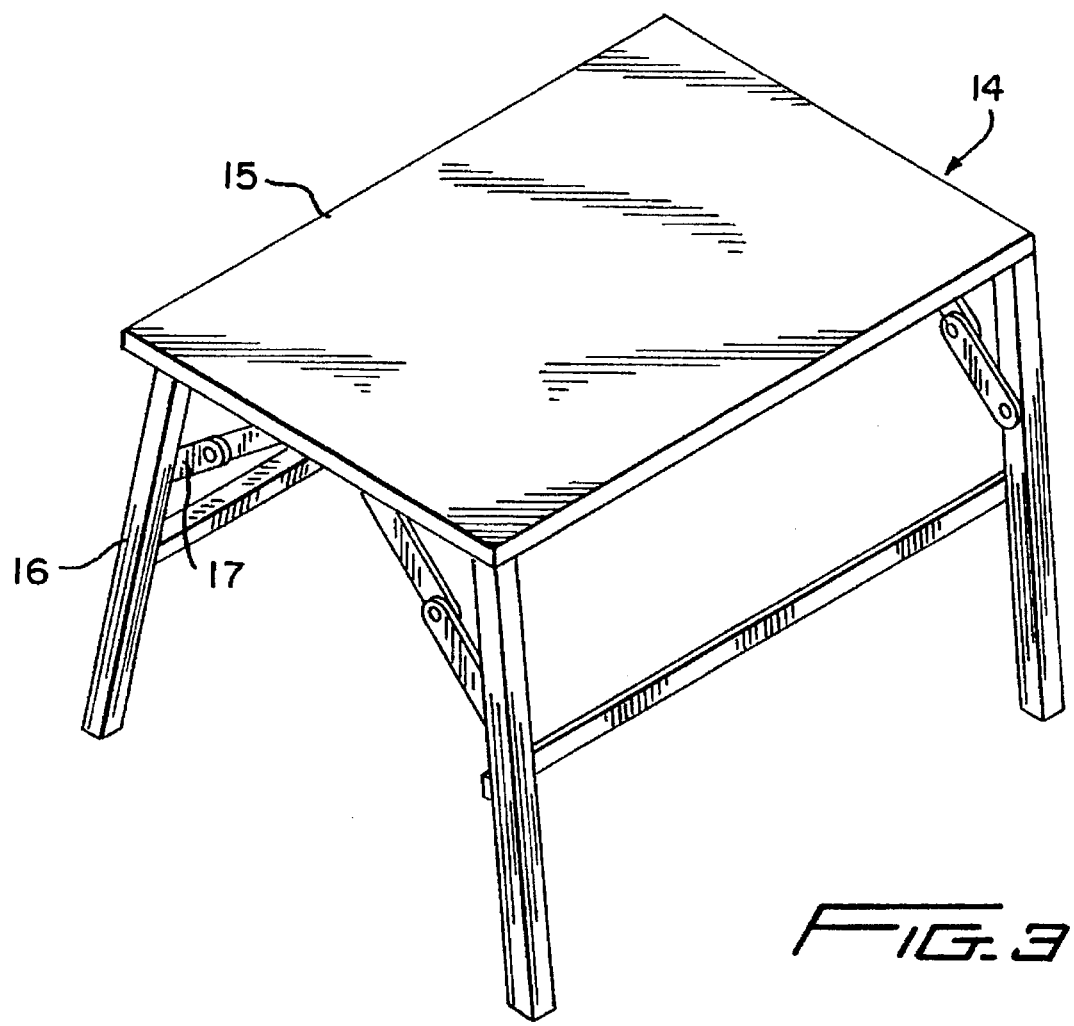
FIG. 3 is a perspective view of the accompanying platform.

FIG. 3 illustrates an accompanying platform 14 which is used to elevate the operator of the camera attached to the tripod. The platform must be lightweight and sturdy. The retractable legs 16 (with hinges 17) are slightly angled outwardly to allow the platform to be placed in close proximity to the riser without coming in contact therewith. Two of the legs 16 may be placed across the legs of base 11 to allow for the closest placement. The platform must be of equal or lesser size to the opening between each leg section 2 of the riser to prevent undesired contact and vibration of the riser.

FIG. 4 illustrates a secondary embodiment of the present invention. The center support legs 7 have been replaced by a singular two-piece tubular support comprising sections 19 and 22. The tubular support is centrally located within the three upper and lower support legs of sections 2 and 11 respectively. Section 22 is fitted into the hollow region of section 19 as shown by dotted line 23. In order to properly close the device 1 it is necessary to rotate the top section 22 sixty degrees with respect to the bottom section 19. A channel 20 allows for a pin located on the encapsulated part of section 22 to slide within the upside-down "U" channel to achieve a sixty degree rotation. A wingnut 21 or other equivalent fastening means secures the two sections 19 and 22 together to prevent unwanted rotation during use.

In operation a user would:

1. Transport the device to a location to be used;
2. Remove VELCRO™ strap 18;
3. Remove base 11 and place onto floor or other desired location;
4. Open leg 2;
5. Unfold legs 5 and 7;
6. Lock into place by pushing down on braces 6 and 8;
7. Placing end caps into receiving section 9;
8. Sequentially repeat this process for the remaining two legs 2;
9. Mount tripod legs in recess well 3; and
10. Stand on platform 14 to operate equipment attached to tripod.

When finished the steps would be performed essentially in reverse to close and transport the device.

In the secondary embodiment, steps 3–7 should be replaced as follows:

3. Unfold sections 2 and 13;
4. Loosen wingnut 21;
5. Rotate center support sections 22 and 19 sixty degrees, unfolding and locking legs 5 during rotation process;
6. Place legs 5 into receiving sections 9 while completing rotation through end of channel 21;
7. Tighten wingnut 21;

Steps 8–10 should then be completed as above.

CONCLUSION

A system and method has been shown in the above embodiments for the effective implementation of a portable tripod riser. While various preferred embodiments have been shown and described, it will be understood that there is no intent to limit the invention by such disclosure, but rather, is intended to cover all modifications and alternate constructions falling within the spirit and scope of the invention as defined in the appended claims. For instance, the particular dimensions of the device should not be limited to that disclosed or shown in the preferred embodiment. The unit can be made as large or small as desired depending on height and/or tripod extension needed. The specific shape of the support or platform can be any such that the device would provide the function as described above. In addition, the particular materials used to construct the device need only meet the requirement of structural strength (i.e. to support camera equipment and a person for the platform) and be relatively light in weight (i.e. be portable). The specific handle, closure securing method or leg stabilizing (i.e. braces 6/8, end-caps, receiving section 9/10) can be modified and interchanged with equivalent methods without destroying the spirit or function of the invention.

I claim:

1. A portable tripod support platform which is collapsible into a folded non-use position for transporting comprising:
   a plurality of upper horizontal support sections each having an upper longitudinal recess;
   at least one vertical support leg pivotally connected to each of said upper horizontal support legs;
   a central vertical support section for supporting said upper horizontal support sections in conjunction with said at least one vertical support leg;
   a plurality of lower support sections each having a top side receiving section for receiving a lower end of each of said vertical supports, and
   wherein said upper, vertical, central vertical and lower supports are operatively connected and fold together during non-use.

2. A portable tripod support platform as per claim 1, wherein each of said upper support sections further comprises a hinge to facilitate folding.

3. A portable tripod support platform as per claim 1, wherein each of said lower support sections further comprises a hinge to facilitate folding.

4. A portable tripod support platform as per claim 1, wherein each of said upper and lower support sections are centrally connected and separated equidistantly.

5. A portable tripod support platform as per claim 1, wherein upper edges of each of said lower support sections are bevelled.

6. A portable tripod support platform as per claim 1, wherein each of said vertical support legs has an end-cap which fits into each of said respective receiving sections.

7. A portable tripod support platform as per claim 1, further comprising a handle attached to one of said lower support legs.

8. A portable tripod support platform as per claim 1, wherein said central vertical support section comprises an upper section and a lower section which are rotatable sixty degrees with respect to each other, said plurality of upper horizontal support sections are pivotally connected, said plurality of lower support sections are pivotally connected with said upper horizontal support sections folded downward around said central vertical support during non-use, said upper and lower sections of said central vertical support rotated sixty degrees and then said lower support sections folded upward around said central vertical support.

9. A portable tripod support platform as per claim 8, wherein said central vertical support section comprises a channel which guides the rotation of said upper and lower sections.

10. A portable tripod support platform which is collapsible into a folded non-use position for transporting comprising:
    a plurality of upper horizontal support sections each having an upper longitudinal recess;
    a plurality of vertical support legs pivotally connected to a lower side of each of said upper horizontal support legs;
    a central vertical support section for supporting said upper horizontal support sections in conjunction with said plurality of vertical support legs;
    a plurality of lower support sections each having a top side receiving section for receiving a lower end of each of said vertical support legs, and
    wherein said upper horizontal support sections are centrally connected, said lower support sections are centrally connected and said upper, vertical, central vertical and lower supports are operatively connected and fold together during non-use.

11. A portable tripod support platform as per claim 10, wherein each of said upper support sections further comprises a hinge to facilitate folding.

12. A portable tripod support platform as per claim 10, wherein each of said lower support sections further comprises a hinge to facilitate folding.

13. A portable tripod support platform as per claim 10, wherein each of said upper and lower support sections are equidistantly separated.

14. A portable tripod support platform as per claim 10, further comprising a handle attached to one of said lower support legs.

15. A portable tripod support platform which is collapsible into a folded non-use position for transporting comprising:

- a plurality of centrally connected upper horizontal support sections each having an upper longitudinal recess;
- a vertical support leg pivotally connected to a lower side of each of said upper horizontal support legs;
- a central vertical support section for supporting said upper horizontal support sections in conjunction with said vertical support legs;
- said central vertical support section comprising an upper section and a lower section which are rotatable sixty degrees with respect to each other using a channel which guides the rotation of said upper and lower sections;
- a plurality of centrally connected lower support sections each having a top side receiving section for receiving a lower end of each of said vertical support legs, and wherein said upper horizontal support sections are equidistantly connected, said lower support sections are equidistantly connected and said upper, vertical, central vertical and lower supports are operatively connected and fold together during non-use by said vertical support legs folding into said upper horizontal support sections, said upper horizontal support sections the folding downward around said central vertical support, said upper and lower sections of said central vertcial support rotated sixty degrees and then said lower support sections folded upward around said central vertical support.

16. A portable tripod support platform which is collapsible into a folded non-use position for transporting comprising:

- a plurality of equidistantly separated upper horizontal support sections;
- a plurality of vertical support legs operatively connected to each of said upper horizontal support legs;
- a central vertical support section for supporting said upper horizontal support sections in conjunction with said at least one vertical support leg, and
- wherein said upper, vertical and central vertical supports are operatively connected and fold together during non-use.

17. A portable tripod support platform as per claim 16, wherein each of said plurality of upper support sections are centrally connected.

18. A portable tripod support platform as per claim 16, wherein said central vertical support section comprises an upper section and a lower section which are rotatable sixty degrees with respect to each other, said plurality of upper horizontal support sections are pivotally connected, said plurality of lower support sections are pivotally connected, said vertical support legs folding into said upper horizontal support sections with said upper horizontal support sections folded downward around said central vertical support during non-use, said upper and lower sections of said central vertical support rotated sixty degrees and then said lower support sections folded upward around said central vertical support.

19. A portable tripod support platform which is collapsible into a folded non-use position for transporting comprising:

- three equidistantly separated upper horizontal support sections each supporting a tripod leg;
- said upper horizontal support sections each comprising a tripod leg receiving section for retaining said tripod leg;
- one or more vertical support legs operatively connected to a lower side of each of said upper horizontal support legs, and wherein said upper horizontal support sections are centrally connected and said upper and vertical support sections are operatively connected and fold together during non-use.

20. A portable tripod support platform as per claim 19, wherein said one or more vertical support legs comprises at least a central vertical support section for supporting said upper horizontal support sections.

* * * * *

UNITED STATES PATENT AND TRADEMARK OFFICE
CERTIFICATE OF CORRECTION

PATENT NO. : 5,653,179
DATED : August 5, 1997
INVENTOR(S) : Charles S. Kendall

It is certified that error appears in the above-identified patent and that said Letters Patent is hereby corrected as shown below:

Title page, item

[*] The patent number should read -- 5,473,996 --

Col. 1, line 10, after "directed" insert therefore --to--.

Col. 2, line 18, after "8" insert --,--.

Col. 2, line 28, after "of" insert --a--.

Col. 2, line 28, after "partially" delete "a".

Col. 3, line 26, after "finished" insert --,--.

Col. 5, line 35, delete "the" insert therefore --then--.

Col. 5, line 37, "vertcial" should read "vertical".

Signed and Sealed this

Sixteenth Day of December, 1997

*Attest:*

BRUCE LEHMAN

*Attesting Officer*     Commissioner of Patents and Trademarks